United States Patent [19]
Huang

[11] Patent Number: 5,216,710
[45] Date of Patent: Jun. 1, 1993

[54] LIQUID CRYSTAL DISPLAY DRIVER AND POWER SUPPLY

[75] Inventor: Stephen Huang, Hsinchu, Taiwan

[73] Assignee: Winbond Electronics Corp., Hsinchu, Taiwan

[21] Appl. No.: 637,676

[22] Filed: Jan. 7, 1991

[51] Int. Cl.[5] .............................................. H04M 1/02
[52] U.S. Cl. ................................... 379/362; 379/387; 379/354; 379/413
[58] Field of Search ............... 379/413, 354, 355, 322, 379/324, 362, 359, 387, 388

[56] References Cited

U.S. PATENT DOCUMENTS

| | | | |
|---|---|---|---|
| 4,086,442 | 4/1978 | Rickard | 379/354 |
| 4,286,120 | 8/1981 | Sublette | 379/362 |
| 4,341,991 | 7/1982 | Geboers et al. | 379/387 X |
| 4,521,648 | 6/1985 | Hegi | 379/359 X |
| 4,527,016 | 7/1985 | Sublette | 379/359 |
| 4,564,726 | 1/1986 | Ibata | 379/362 X |
| 4,647,787 | 3/1987 | Pommer, II | 379/387 X |
| 4,723,276 | 2/1988 | Rault | 379/388 |
| 4,736,410 | 4/1988 | Nishida et al. | 379/354 |
| 4,748,664 | 5/1988 | Blomley | 379/387 X |
| 4,794,640 | 12/1988 | Yeh | 379/388 |

FOREIGN PATENT DOCUMENTS

| | | | |
|---|---|---|---|
| 2038551 | 3/1978 | Fed. Rep. of Germany | 379/362 |
| 3512327 | 10/1986 | Fed. Rep. of Germany | 379/362 |
| 0169259 | 9/1984 | Japan | 379/362 |

Primary Examiner—James L. Dwyer
Assistant Examiner—M. Shehata
Attorney, Agent, or Firm—Harness, Dickey & Pierce

[57] ABSTRACT

A liquid crystal display driver and power supply for use with a telephone dialing circuit reduces the potential of an external power supply to the telephone dialing circuit to a desired voltage level. The reduced potential is then stabilized and a second voltage signal, which is a function of the stabilized voltage signal, is generated to drive and supply power to a liquid crystal display of the telephone dialing circuit. The liquid crystal display driver and power supply and the telephone dialing circuit can be integrated in a single IC chip.

1 Claim, 2 Drawing Sheets

LIQUID CRYSTAL DISPLAY DRIVER AND POWER SUPPLY

BACKGROUND OF THE INVENTION

1. Field Of The Invention

The invention relates to a liquid crystal display (LCD) driver and power supply, more particularly to an LCD display driver and power supply for the LCD display of a telephone dialing circuit.

2. Description Of The Related Art

Display drivers for the LCD display of a telephone dialing circuit are known in the art. However, the power supply for the LCD display is not the same power supply as that of the telephone dialing circuit because of incompatibility in voltage ratings. The usual power supply voltage of the telephone dialing circuit ranges from 2 to 5.5 volts, while the usual input voltage of an LCD display of a size used in ordinary calculators is approximately 3 volts. If a voltage of more than 3 volts is used to supply power to the liquid crystal display, problems concerning the illumination of the segments found on the LCD display arises. This is one reason why the input voltage supplied to the LCD display must be kept as stable as possible.

A simple solution to this problem is to reduce the power supply voltage to a value of 3 volts if the power supply voltage is greater than 3 volts. However, if the power supply voltage is 3 volts or less, further reduction cannot be done since an input voltage of less than 3 volts would not drive the LCD display.

This problem of not having the same power source for the LCD display and the telephone dialing circuit makes the present systems more expensive and, at the same time, takes up much more space than it would if the LCD display and the telephone dialing circuit have the same power supply.

SUMMARY OF THE INVENTION

Therefore, the objective of the present invention is to provide a liquid crystal display driver and power supply for the LCD display of a telephone dialing circuit which has the same power source as that of the telephone dialing circuit.

Another object of the present invention is to provide an LCD display driver and power source which can be integrated with the telephone dialing circuit in a single IC chip, making it compact and less expensive.

Accordingly, the liquid crystal display driver and power supply of the present invention comprises means for limiting the voltage of an external power supply of the telephone dialing circuit to a desired voltage level and stabilizing the limited voltage, and means for generating a voltage level which is a function of the stabilized voltage and which can be used to drive and supply power to the LCD display.

The generating means comprises charging means to initially charge an external capacitor to the stabilized voltage and a multiplying means to generate a voltage signal which is twice the stabilized voltage and which can be used to drive and supply power to the liquid crystal display of the telephone dialing circuit.

BRIEF DESCRIPTION OF THE DRAWINGS

Other advantages and characteristics of the present invention will become apparent from the following detailed description of the preferred embodiment when read in conjunction with the accompanying drawings, of which.

DETAILED DESCRIPTION OF THE PREFERRED EMBODIMENT

Figure 1:
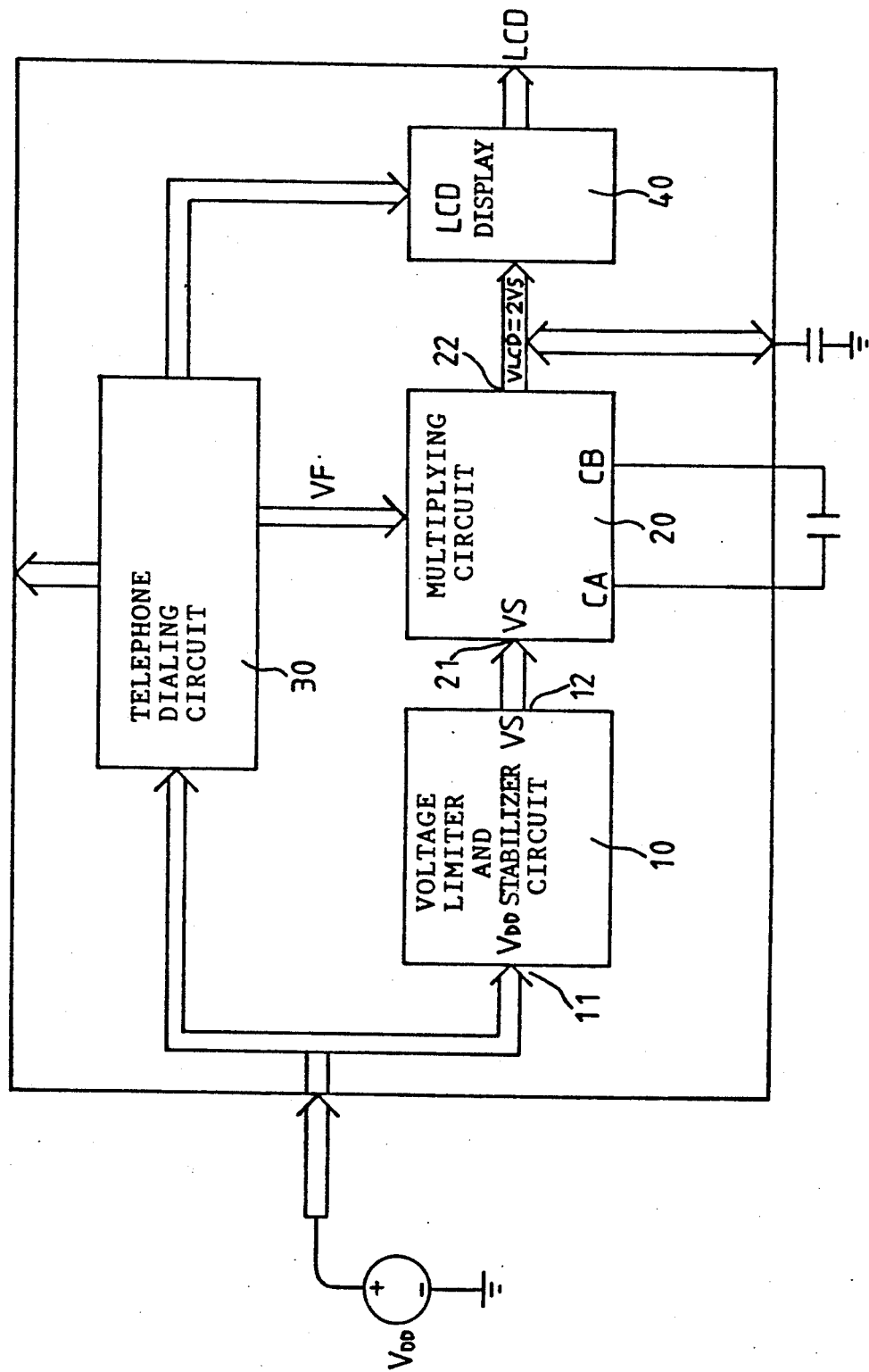
FIG. 1 is a schematic block diagram of the preferred embodiment and its intended environment.

FIG. 1 shows a schematic block diagram of the preferred embodiment. Circuit block 10 is a voltage limiter and stabilizer circuit means with an input 11 electrically connected to an external power supply VDD. The external supply VDD also supplies power to a telephone dialing circuit 30. The output 12 of the circuit block 10 is a voltage signal VS electrically connected to an input 21 of a circuit block 20. Circuit block 20 is a multiplying circuit means whose output 22 is a voltage signal VLCD, which is two times the voltage signal VS. The voltage signal VLCD is used to drive and supply power to a liquid crystal display (LCD) 40.

Figure 2:
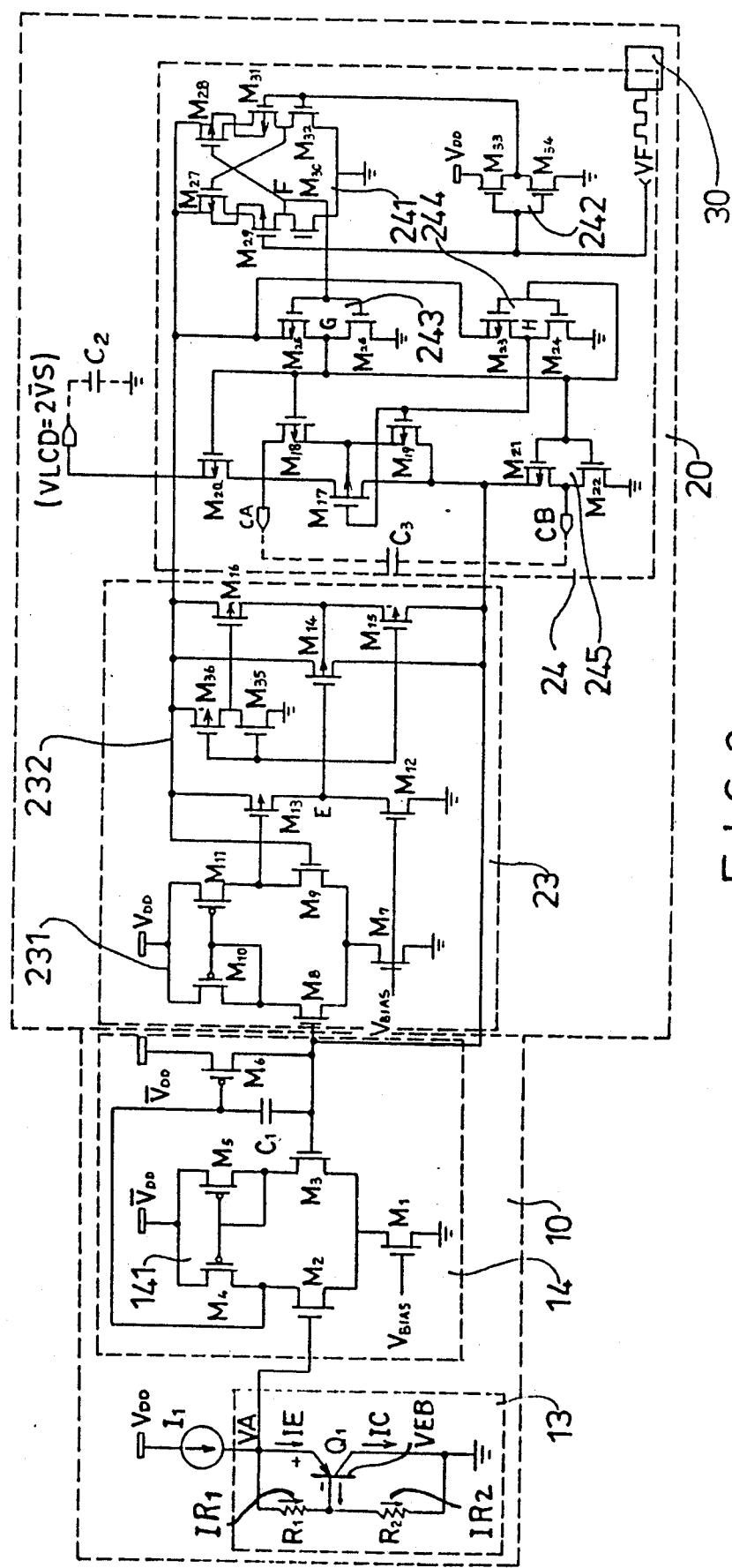
FIG. 2 is a circuit diagram of the preferred embodiment.

Referring to FIG. 2, the circuit block 10 is shown to comprise a signal limiter 13 electrically connected to a stabilizer circuit 14. The signal limiter 13 includes a PNP transistor Q1. A current supply I1 has its input electrically connected to the voltage supply VDD and has its output electrically connected to the emitter of the transistor Q1. A resistor R1 has terminals connected to the emitter and base of the transistor Q1, and a second resistor R2 has terminals connected to the base and collector of the same. The collector of the transistor Q1 is grounded. When the supply current I1 increases to a high level, the collector current IC of the transistor Q1 is approximately equal to the emitter current IE of the same. The base current IB is now considered negligible compared to the emitter current IE, and thus, the current IR1 passing through the resistor R1 can be considered equal to the current IR2 passing through the resistor R2. To determine the relationship between the voltage VA at the emitter of transistor Q1 and the resistors R1 and R2, the following nodal and mesh equations are used:

$$\begin{aligned}
VA &= VEB + VR2 \\
&= VEB + IR2 \times R2 \\
&= VEB + IR1 \times R2 \\
&= VEB + (VEB/R1) \times R2 \\
&= VEB (1 + R2/R1)
\end{aligned}$$

The typical input voltage of the telephone dialing circuit 30 ranges from 2 volts to 5.5 volts. The values of the resistors R1 and R2 are chosen so as to make the voltage VA equal to 1.5 volts. (The voltage VEB is typically 0.6 volts for a silicon transistor.) The voltage VA serves as an input to a buffer 141 of the stabilizer circuit 14. A P-channel metal oxide semiconductor (PMOS) transistor M6, which has a source connected to the supply VDD, has a drain connected to the output of the buffer 141. The amount of current coming from the supply VDD through the transistor M6 automatically adjusts the gate voltage VS of a transistor M3 of the buffer 141 into a stable output voltage.

The circuit block 20 comprises a charging circuit means 23 and a voltage multiplier circuit means 24. The charging circuit means 23 has a comparator circuit means 231 and a switching circuit means 232. The comparator circuit means 231 comprises two PMOS transistors M10 and M11 and three N-channel metal oxide semiconductor (NMOS) transistors M7, M8 and M9. The voltage signal across the gate of the transistor M9 charges an external capacitor C2. The voltage across said capacitor C2 is designated as VLCD and is the voltage used to drive the LCD display. The switching circuit 232 comprises five PMOS transistors M13, M14, M15, M16 and M36, and two NMOS transistors M12 and M35. The input of the switching circuit means 232 is at the gate of the transistor M13 (hereinafter designated as node D) and is electrically connected to the drains of the transistors M9 and M11. The gate of the transistor M14 (hereinafter designated as node E) is connected to the drains of the transistors M12 and M13. The drain of the transistor M14 is connected to the gate of the transistor M8 and the source of the same is connected to the gate of the transistor M9.

The voltage multiplier circuit means 24 comprises a reference level shifting means 241, and four CMOS logic inverting means 242, 243, 244, and 245. The reference level shifting means 241 comprises four PMOS transistors M27, M28, M29, and M31, and two NMOS transistors M30 and M32. The logic inverting means 242 comprises two NMOS transistors M33 and M34, while each of the logic inverting means 243, 244 and 245 comprise one PMOS transistor and one NMOS transistor. The logic inverting means 242, 243, 244 and 245 have their drains tied together as are their gates. The logic inverting means 242 has its gates connected to the gate of the transistor M29 and its drains connected to the gates of the transistors M32 and M31. The telephone dialing circuit 30 is connected to the gates of the logic inverting means 242 and inputs to the same a pulse driving signal VF, which has a peak voltage of VDD. The voltage multiplier circuit means 24 further comprises four PMOS transistors M17, M18, M19 and M20 with a contact point CA at the drain of the transistor M20 and a second contact point CB at the drains of the transistors M21 and M22 of the logic inverting means 245. An external capacitor C3 is connected between the two contact points CA, CB.

The operation of the preferred embodiment is as follows:

1. Initially, the voltage signal VS at the gate of the transistor M8 is greater than the voltage signal VLCD at the gate of the transistor M9. (The LCD display is initially in an OFF state.) The transistor M11 conducts, and thus, the node D goes high and the node E goes low. The transistor M14 then conducts, and allows the voltage signal VS to charge the capacitor C2.

2. When the capacitor C2 is charged to a certain level, the voltage multiplier circuit means 24 begins to operate. As the voltage signal VLCD approaches the value of the voltage signal VS, the potential at the node D begins to drop, and the transistor M13 begins to conduct, making the potential at the node E approach the voltage signal VLCD to thereby turn off the transistor M14.

3. When the potential of the pulse driving signal VF is equal or approximately equal to the potential of the external power supply VDD, the potential at the gate of the transistor M28 (hereinafter designated as node F) and at the gates of the transistors M17 and M19 (hereinafter designated as node H) is nearly equal to the ground potential, while the potential at the gates of the transistors M18 and M20 (hereinafter designated as node G) is approximately equal to the voltage signal VLCD. The transistors M17, M19 and M22 are in a conducting state, while the transistors M18, M20 and M21 are in an OFF state. The external capacitor C3 is then charged to a potential, equal to the voltage signal VS, by a signal having a path through the transistor M17, the contact point CA, the contact point CB, the transistor M22, and finally, to the ground.

4. When VF is equal to the ground potential, the nodes F and H have a potential approximately equal to the voltage signal VLCD, while the potential at the node G is nearly equal to the ground potential. The transistors M18, M20, and M21 are in a conducting state, while the transistors M17, M19, and M22 are in an OFF state. The potential at the source of the transistor M21 is equal to the voltage signal VS. The transistor M21 conducts, bringing the potential at the contact point CB to a potential approximately equal to the voltage signal VS. With the potential across the contact points CA and CB or the capacitor C3 approximately equal to the voltage signal VS, the potential across the contact point CA and the ground is equal to the sum of the potential across the capacitor C3 and the potential across the contact point CB and the ground, thereby increasing the potential at the contact point CA to about 2VS and eventually charging the capacitor C2 to a potential approximately equal to 2VS through the transistor M20.

Accordingly, the preferred use of the present invention is in a telephone dialing circuit 30 having an external power supply VDD within the range of 2 to 5.5 volts. The first circuit block 10 reduces this potential to a stable 1.5 volts and the second circuit block 20 increases the stable potential into a signal of approximately 3 volts, which can be eventually used to drive the liquid crystal display 40 of the telephone dialing circuit 30.

While the present invention has been described in connection with what is considered the most practical and preferred embodiment, it is understood that the invention is not limited to the disclosed embodiment, but is intended to cover various arrangements included within the spirit and scope of the broadest interpretation so as to encompass all such modifications and equivalent arrangements.

I claim:

1. A liquid crystal display driver for a liquid crystal display of a telephone dialing circuit which has an external power supply input and a pulsating driving signal output, said external power supply input having a voltage output which is incompatible with a driving voltage input that is required by said liquid crystal display, said liquid crystal display driver comprising:

voltage limiting and stabilizing means for limiting said voltage output of said external power supply input, said volte limiting and stabilizing mean generating a stabilized voltage signal which is approximately one-half of said driving voltage signal input; and multiplying means for multiplying said stabilized voltage signal by a factor of two so as to generate said driving voltage input to drive and supply power to said liquid crystal display, said multiplying means including:
  a first capacitor;
  first charging means for initially charging said first capacitor to a potential equal to said stabilized voltage signal,
    said first charging means including switching means for disabling said first charging means when the potential across said first capacitor is approximately equal to said stabilized voltage signal;

a second capacitor;

a second charging means for charging said second capacitor to a potential equal to said stabilized voltage signal when aid pulsating driving signal output is approximately equal to said voltage output of said external power supply input;

potential generating means of generating a potential that is approximately equal to said stabilized voltage signal when said pulsating driving signal output is approximately equal to a ground potential; and third charging means or charging said first capacitor to a potential equal to the sum of the potential across said second capacitor and the potential from said potential generating means, thereby charging said first capacitor to approximately twice said stabilized voltage signal so as to generate said driving voltage input.

* * * * *

UNITED STATES PATENT AND TRADEMARK OFFICE
CERTIFICATE OF CORRECTION

PATENT NO. : 5,216,710
DATED : June 1, 1993
INVENTOR(S) : Stephen Huang

It is certified that error appears in the above-identified patent and that said Letters Patent is hereby corrected as shown below:

Column 4, line 54, claim 1, "volte" should be --voltage--.

Column 4, line 54, claim 1, "mean" should be --means--.

Column 5, line 5, claim 1, delete "a".

Column 5, line 7, claim 1, "aid" should be --said--.

Signed and Sealed this

First Day of March, 1994

Attest:

BRUCE LEHMAN

Attesting Officer

Commissioner of Patents and Trademarks